US008941757B2

(12) United States Patent
Seok et al.

(10) Patent No.: US 8,941,757 B2
(45) Date of Patent: Jan. 27, 2015

(54) APPARATUS AND METHOD FOR ADJUSTING WHITE BALANCE

(71) Applicant: Samsung Electronics Co., Ltd., Suwon-si (KR)

(72) Inventors: Jin-Keun Seok, Suwon-si (KR); Jae-Hee Park, Hwaseong-si (KR); Yong-Gu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 249 days.

(21) Appl. No.: 13/679,076

(22) Filed: Nov. 16, 2012

(65) Prior Publication Data

US 2013/0128073 A1 May 23, 2013

(30) Foreign Application Priority Data

Nov. 22, 2011 (KR) .................. 10-2011-0122059

(51) Int. Cl.
*H04N 9/73* (2006.01)
*H04N 5/228* (2006.01)
*H04N 5/76* (2006.01)
*G06K 9/00* (2006.01)

(52) U.S. Cl.
CPC .................................. *H04N 9/735* (2013.01)
USPC .................. 348/223.1; 348/222.1; 348/231.6; 382/103; 382/167

(58) Field of Classification Search
USPC ................... 348/222.1–225.1, 231.99–231.9, 348/333.01–333.12; 382/103, 162–167
See application file for complete search history.

(56) References Cited

U.S. PATENT DOCUMENTS

| | | | | |
|---|---|---|---|---|
| 6,678,407 | B1 * | 1/2004 | Tajima | 382/167 |
| 6,975,759 | B2 * | 12/2005 | Lin | 382/167 |
| 7,146,041 | B2 * | 12/2006 | Takahashi | 382/167 |
| 7,702,148 | B2 * | 4/2010 | Hayaishi | 382/167 |
| 8,089,525 | B2 * | 1/2012 | Takayama | 348/222.1 |
| 8,160,310 | B2 * | 4/2012 | Takayama | 382/118 |
| 8,294,783 | B2 * | 10/2012 | Kitajima | 348/223.1 |
| 8,462,228 | B2 * | 6/2013 | Nakamura | 348/224.1 |
| 8,520,091 | B2 * | 8/2013 | Fujiwara et al. | 348/223.1 |
| 2003/0090750 | A1 * | 5/2003 | Takahashi | 358/516 |
| 2003/0169348 | A1 * | 9/2003 | Ikeda et al. | 348/223.1 |
| 2004/0041941 | A1 * | 3/2004 | Takeshita | 348/371 |
| 2004/0208114 | A1 * | 10/2004 | Lao et al. | 369/125 |
| 2004/0212691 | A1 * | 10/2004 | Sato | 348/223.1 |
| 2005/0179780 | A1 * | 8/2005 | Kikkawa et al. | 348/207.99 |
| 2005/0265626 | A1 * | 12/2005 | Endo et al. | 382/274 |
| 2006/0008173 | A1 * | 1/2006 | Matsugu et al. | 382/274 |
| 2006/0171605 | A1 * | 8/2006 | Watanabe | 382/274 |
| 2006/0284991 | A1 * | 12/2006 | Ikeda | 348/223.1 |
| 2007/0065006 | A1 * | 3/2007 | Wilensky | 382/167 |
| 2007/0070214 | A1 * | 3/2007 | Nakamura | 348/222.1 |

(Continued)

*Primary Examiner* — Michael Osinski
(74) *Attorney, Agent, or Firm* — Jefferson IP Law, LLP

(57) ABSTRACT

An apparatus and method for adjusting a white balance, and more particularly, an apparatus and method for adjusting a white balance of an image captured with a complex light source are provided. The apparatus includes a camera unit, and a controller for controlling recognition of a facial image from an image captured by the camera unit and, if it is determined that the image has been captured with a complex light source based on a comparison between a white balance gain calculated based on a facial skin color of the recognized facial image and a white balance gain calculated based on a white balance scheme, for adjusting a white balance of the captured image based on a final white balance gain extracted by interpolating the two white balance gains.

19 Claims, 6 Drawing Sheets

(56) References Cited

U.S. PATENT DOCUMENTS

| | | |
|---|---|---|
| 2007/0280538 A1* | 12/2007 | Okamoto .................... 382/190 |
| 2008/0211925 A1* | 9/2008 | Misawa et al. ............ 348/223.1 |
| 2009/0002518 A1* | 1/2009 | Nakamura ................. 348/223.1 |
| 2009/0002519 A1* | 1/2009 | Nakamura ................. 348/223.1 |
| 2009/0021602 A1* | 1/2009 | Fujiwara et al. ........... 348/223.1 |
| 2009/0167892 A1* | 7/2009 | Takayama ................. 348/223.1 |
| 2009/0225226 A1* | 9/2009 | Kakuta ........................ 348/655 |
| 2010/0014775 A1* | 1/2010 | Ikeda ............................ 382/274 |
| 2010/0208099 A1* | 8/2010 | Nomura ..................... 348/223.1 |
| 2010/0295977 A1* | 11/2010 | Manabe ........................ 348/254 |
| 2011/0091107 A1* | 4/2011 | Sugihara ....................... 382/173 |
| 2011/0096986 A1* | 4/2011 | Yokoyama et al. ........... 382/167 |
| 2011/0299771 A1* | 12/2011 | Cheddad et al. .............. 382/165 |
| 2013/0088623 A1* | 4/2013 | Ashida et al. ................. 348/294 |
| 2013/0113956 A1* | 5/2013 | Anderson et al. .......... 348/223.1 |
| 2014/0168463 A1* | 6/2014 | Tamura ..................... 348/223.1 |

* cited by examiner

APPARATUS AND METHOD FOR ADJUSTING WHITE BALANCE

PRIORITY

This application claims priority under 35 U.S.C. §119(a) to a Korean patent application filed in the Korean Intellectual Property Office on Nov. 22, 2011 and assigned Serial No. 10-2011-0122059, the entire disclosure of which is hereby incorporated by reference.

BACKGROUND OF THE INVENTION

1. Field of the Invention

The present invention relates generally to an apparatus and method for adjusting a white balance. More particularly, the present invention relates to an apparatus and method for adjusting a white balance of an image captured with a complex light source.

2. Description of the Related Art

Cameras express most proper colors under an arbitrary light source via an Auto White Balance (AWB) function. Light input to a sensor of a camera depends on a spectrum of a light source and a reflection spectrum of a subject. When a White or Gray subject is exposed by a low or high color temperature light source, the White or Gray subject is expressed Red by the low color temperature light source and Blue by the high color temperature light source. The AWB function compensates for this (i.e., expresses a White color as is).

An AWB function allows a Gray area to be extracted under a complex light source and allows a Red gain (Rgain: G/R) and a Blue gain (Bgain: G/B) to be obtained so that percentages of Red (R), Green (G), and Blue (B) are the same in the Gray area. The Rgain and the Bgain are multiplied by each pixel in a whole image as a white balance gain, which is calculated and applied according to the Gray area regardless of the presence/absence of a human face in the image.

Estimating a Gray area is the core of AWB technology, and various technologies show relatively high performances under a single light source. However, since various Gray areas having different reflection spectral characteristics may be present under a complex light source, it is difficult to extract a proper Gray area, resulting in decreased AWB performance.

In particular, in an image including a human face that is captured under a condition where the face is exposed by a high color temperature light source while a background is exposed by a relatively low color temperature light source, if a white balance is adjusted to be suitable for the background, a facial color may be expressed bluer than an actual facial color, resulting in the face appearing lifeless.

SUMMARY OF THE INVENTION

Aspects of the present invention are to address at least the above-mentioned problems and/or disadvantages and to provide at least the advantages described below. Accordingly, an aspect of the present invention is to provide an apparatus and method for adjusting a white balance of an image captured with a complex light source.

Another aspect of the present invention is to provide an apparatus and method for adjusting a white balance to increase power of expression in a facial skin color by determining an image captured with a complex light source based on the facial skin color of a facial image recognized from the captured image and adjusting a white balance of the image captured with the complex light source.

In accordance with an aspect of the present invention, an apparatus for adjusting a white balance is provided. The apparatus includes a camera unit, and a controller for controlling recognition of a facial image from an image captured by the camera unit and, if it is determined that the image has been captured with a complex light source based on a comparison between a white balance gain calculated using a facial skin color of the recognized facial image and a white balance gain calculated using a white balance scheme, for adjusting a white balance of the captured image based on a final white balance gain extracted by interpolating the two white balance gains.

In accordance with another aspect of the present invention, a method of adjusting a white balance is provided. The method includes recognizing a facial image from a captured image, calculating a white balance gain based on a facial skin color of the recognized facial image and calculating a white balance gain based on a normal white balance scheme, and if it is determined based on a comparison between the two calculated white balance gains that the image has been captured with a complex light source, adjusting a white balance of the captured image based on a final white balance gain extracted by interpolating the two white balance gains.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
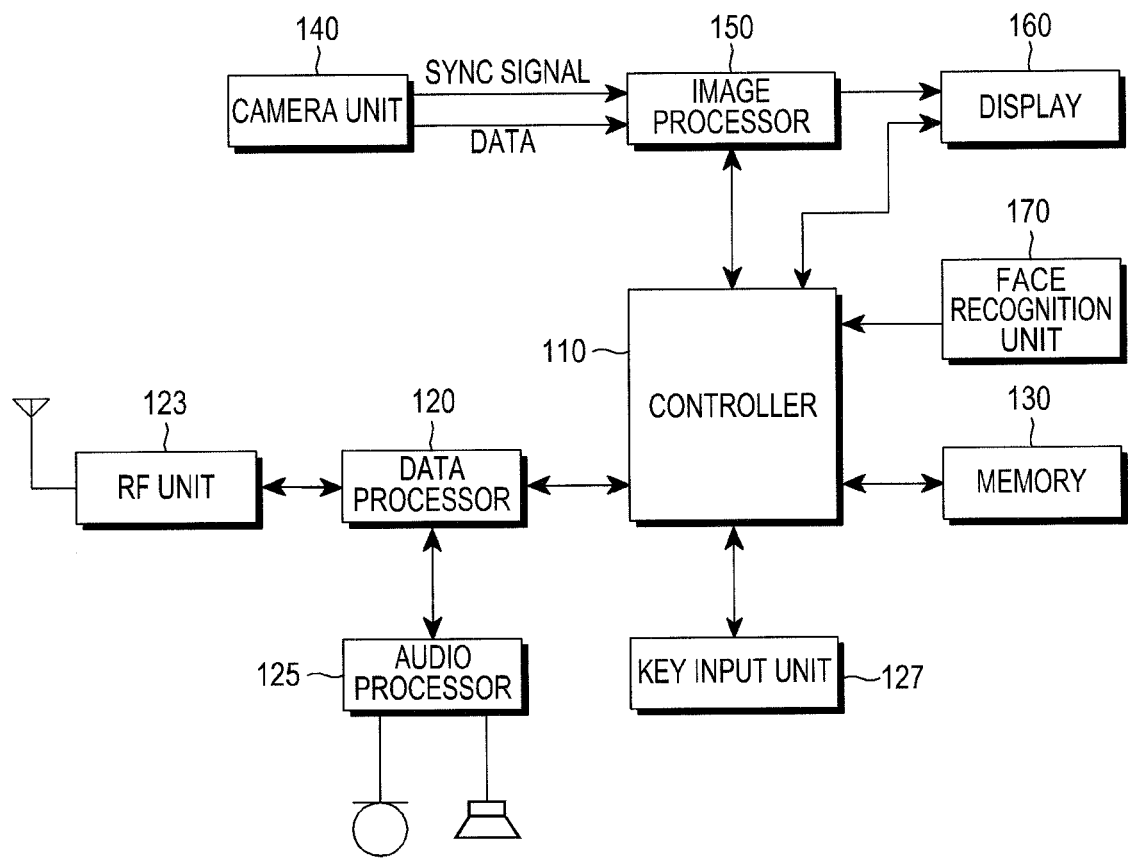
FIG. 1 is a block diagram of a wireless terminal according to an exemplary embodiment of the present invention.

FIG. 1 is a block diagram of a wireless terminal according to an exemplary embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and amplifying the up-converted transmission signal and an RF receiver for low-noise amplifying a received signal and down-converting a frequency of the amplified received signal. A data processor 120 includes a transmitter for coding and modulating the transmission signal and a receiver for demodulating and decoding the received signal. The data processor 120 may include a modem and a codec. The codec includes a data codec for processing packet data and the like, and an audio codec for processing an audio signal such as voice. An audio processor 125 plays a received audio signal output from the audio codec in the data processor 120 and transfers a transmission audio signal picked up by a microphone to the audio codec in the data processor 120.

A key input unit 127 includes alphanumeric keys for inputting alphanumeric information and function keys for setting various functions.

A memory 130 may include a program memory and a data memory. The program memory may store programs for controlling a general operation of the wireless terminal and programs for performing a control to increase power of expression in a facial skin color by determining an image captured with a complex light source based on the facial skin color of a facial image recognized from the captured image and adjusting a white balance of the image captured with the complex light source. The data memory may temporarily store data generated while the programs are executed.

In addition, the memory 130 stores several tables. A first table stores mean R, G, and B values of an arbitrary facial skin color and coordinates (R/G, B/G) indicating a location of the mean R, G, and B values in a skin color coordinate system under each of a plurality of light sources. A second table stores a distance D between a reference light source and each of the other light sources in the plurality of light sources after calculating it. A third table stores a color temperature T of the facial skin color under each of the plurality of light sources based on the reference light source. A fourth table stores a white balance gain of the facial skin color under each of the plurality of light sources in a normal white balance scheme. The first to fourth tables may be previously stored.

A controller 110 controls the overall operation of the wireless terminal. The controller 110 stores the first to fourth tables in the memory 130 to obtain a white balance gain according to a facial skin color according to an exemplary embodiment of the present invention.

If various human faces are photographed under a plurality of arbitrary light sources D75, D65, D55, D50, D40, and A, the controller 110 calculates mean R, G, and B values of RGB data of a facial skin color and coordinates (R/G, B/G) indicating a location of the mean R, G, and B values in a skin color coordinate system, under each of the plurality of light sources D75, D65, D55, D50, D40, and A and stores them in the first table as shown below. The number of light sources may be 6 to 9, and the RGB data of the facial skin color under each of the plurality of light sources D75, D65, D55, D50, D40, and A may be shading-compensated 12-bit data.

FIRST TABLE

|  | D75 | D65 | D55 | D50 | D40 | A |
|---|---|---|---|---|---|---|
| mean R, G, B values | 413, 558, 343 | 497, 595, 341 | 560, 628, 342 | 557, 604, 312 | 519, 590, 231 | 794, 635, 217 |
| R/G, B/G | 0.739, 0.614 | 0.837, 0.574 | 0.892, 0.544 | 0.921, 0.517 | 0.879, 0.393 | 1.251, 0.342 |

Since the light source D55 of the plurality of light sources D75, D65, D55, D50, D40, and A has a most similar color temperature to that of outdoor sunlight, the light source D55 is set as a reference light source in the first table. The controller 110 calculates a distance D between skin color coordinates (R/G, B/G) of the reference light source and skin color coordinates (R/G, B/G) of each of the plurality of light sources in the skin color coordinate system according to Equation 1 and stores the calculated distances D in the second table.

$$D_x = \sqrt{(R_n - R_s)^2 + (B_n - B_s)^2} \qquad \text{Equation 1}$$

Rn and Bn respectively denote values of skin color coordinates (R/G, B/G) of each light source and Rs and Bs respectively denote values of skin color coordinates (R/G, B/G) of the reference light source D55.

SECOND TABLE

|  | D75 | D65 | D55 | D50 | D40 | A |
|---|---|---|---|---|---|---|
| D | 0.1673 | 0.0622 | 0 | 0.0408 | 0.1524 | 0.4126 |

The controller 110 calculates whether a skin color per light source is a skin color under a higher or lower color temperature light source than the reference light source D55 according to Equation 2 and stores the calculated values in the third table.

$$T_n = (R_n - B_n) - (R_s - B_s) \qquad \text{Equation 2}$$

In Equation 2, T<0 indicates a higher color temperature than the reference light source D55, and T>0 indicates a lower color temperature than the reference light source D55.

THIRD TABLE

|   | D75 | D65 | D55 | D50 | D40 | A |
|---|---|---|---|---|---|---|
| T | −0.2216 | −0.0843 | 0 | 0.0576 | 0.1390 | 0.5620 |

The controller 110 calculates a white balance gain for RGB mean data per light source that is stored in the first table by using the normal white balance scheme and stores the calculated white balance gains in the fourth table.

FOURTH TABLE

|   | D75 | D65 | D55 | D50 | D40 | A |
|---|---|---|---|---|---|---|
| R gain/ B gain | −1.966/ 1.305 | 1.812/ 1.381 | 1.686/ 1.412 | 1.703/ 1.514 | 1.559/ 1.820 | 1.287/ 2.240 |

According to an exemplary embodiment of the present invention, when an image is captured by the camera unit 140, if coordinates of a facial image are received from a face recognition unit 170, the controller 110 first calculates a white balance gain by using a facial skin color.

A process of calculating a white balance gain by using a facial skin color will now be described. The controller 110 calculates mean values of RGB data of a facial skin color in a specific region from the facial image coordinates received from the face recognition unit 170. The controller 110 calculates $A(R_x=R/G, B_x=B/G)$ indicating coordinates of the facial skin color in the specific region in the skin color coordinate system by using the calculated mean R, G, and B values. The controller 110 calculates a distance $D_x$ between the skin color coordinates $(R_s=R/G, B_s=B/G)$ of the reference light source D55 and $A(R_x=R/G, B_x=B/G)$ in the skin color coordinate system by using Equation 1 and calculates a color temperature comparison value $T_x$ of $A(R_x=R/G, B_x=B/G)$ compared with the reference light source D55 by using Equation 2.

The controller 110 extracts $B(R_1, B_1)$ and $C(R_2, B_2)$. $B(R_1, B_1)$ are skin color coordinates for a light source having a larger distance than the calculated distance $D_x$ between the skin color coordinates $(R_s, B_s)$ of the reference light source D55 and $A(R_x, B_x)$. $C(R_2, B_2)$ are skin color coordinates for a light source having a smaller distance than the calculated distance $D_x$ between the skin color coordinates $(R_s, B_s)$ of the reference light source D55 and $A(R_x, B_x)$ while having the same sign as that of the calculated color temperature comparison value $T_x$ of $A(R_x, B_x)$ compared with the reference light source D55. The distance $D_x$ and the color temperature comparison value $T_x$ may be obtained from the second and third tables stored in the memory 130.

The controller 110 calculates a distance $K_1$ between $A(R_x, B_x)$ and $B(R_1, B_1)$ and a distance $K_2$ between $A(R_x, B_x)$ and $C(R_2, B_2)$ by using Equation 3 below.

$$k_1=\sqrt{(R_x-R_1)^2+(B_x-B_1)^2}, k_2=\sqrt{(R_x-R_2)+(B_x-B_2)^2} \quad \text{Equation 3}$$

The controller 110 extracts white balance gains of $B(R_1, B_1)$ and $C(R_2, B_2)$ from the fourth table stored in the memory 130 and calculates a white balance gain $(RGain_{Face}, BGain_{Face})$ by interpolating the extracted white balance gains of $B(R_1, B_1)$ and $C(R_2, B_2)$ according to a distance ratio based on $A(R_x, B_x)$ by using Equation 4 below.

$$WBgain_R = \frac{K_2}{K_1+K_2} + WBgain_1 + \frac{K_1}{K_1+K_2} WBgain_2 \quad \text{Equation 4}$$

In Equation 4, $WBgain_1$ denotes an R gain of the white balance gain of $B(R_1, B_1)$, $WBgain_2$ denotes an R gain of the white balance gain of $C(R_2, B_2)$, and $$WBgain_B = \frac{K_2}{K_1+K_2} + WBgain_1 + \frac{K_1}{K_1+K_2} WBgain_2$$

where $WBgain_1$ denotes a B gain of the white balance gain of $B(R_1, B_1)$, $WBgain_2$ denotes a B gain of the white balance gain of $C(R_2, B_2)$.

Upon calculating the white balance gain $(RGain_{Face}, BGain_{Face})$ by using the facial image, the controller 110 calculates a white balance gain $(RGain_{Normal}, BGain_{Normal})$ according to a white balance scheme. The controller 110 compares the white balance gain $(RGain_{Face}, BGain_{Face})$ calculated by using the facial skin color and the white balance gain $(RGain_{Normal}, BGain_{Normal})$ calculated in the normal white balance scheme with a predetermined reference white balance gain $(RGain_{Threshold}, BGain_{Threshold})$ and determines that the image has been captured with a complex light source if $RGain_{Face}-RGain_{Normal}>RGain_{Threshold}$ and $BGain_{Face}-BGain_{Normal}<BGain_{Threshold}$.

If it is determined that the image has been captured with a complex light source, the controller 110 extracts a final white balance gain by interpolating the white balance gain $(RGain_{Face}, BGain_{Face})$ calculated by using the facial image and the white balance gain $(RGain_{Normal}, BGain_{Normal})$ calculated according to a white balance scheme. The controller 110 multiplies the extracted final white balance gain by each pixel in the whole area of the captured image, transforms RGB data of the facial image in the captured image to YUV data, adjusts the YUV data by multiplying the YUV data by a predetermined constant to decrease a U value and increase a V value, and transforms the adjusted YUV data to RGB data.

A camera unit 140 includes a camera sensor for capturing image data and converting the captured optical signal into an electrical signal, and a signal processor for converting an analog image signal captured by the camera sensor into digital data. The camera sensor is assumed herein to be a Charge-Coupled Device (CCD) or Complementary Metal Oxide Semiconductor (CMOS) sensor, and the signal processor may be realized by a Digital Signal Processor (DSP). However, other camera sensor technologies may be employed. The camera sensor and the signal processor may be realized in an integrated manner or in a separated manner.

An image processor 150 performs Image Signal Processing (ISP) for displaying image signals output from the camera unit 140 on a display unit 160. The ISP performs functions such as gamma correction, interpolation, spatial variation, image effects, image scaling, Automatic White Balance (AWB), Automatic Exposure (AE), and Automatic Focusing (AF). The image processor 150 processes the image signals output from the camera unit 140 on a frame basis, and outputs the frame-based image data according to the characteristics and size of the display unit 160. The image processor 150, which includes a video codec, compresses frame image data displayed on the display unit 160 by preset coding, and restores (or decompresses) the compressed frame image data into its original frame image data. The video codec may include a JPEG codec, an MPEG4 codec, a Wavelet codec, etc. Assuming that the image processor 150 includes an On-Screen Display (OSD) function, the controller 110 may control the image processor 150 to output OSD data according to the size of a screen on which the data is displayed.

The display unit 160 displays an image output from the image processor 150 and user data output from the controller 110 on a screen. The display unit 160 may include a Liquid Crystal Display (LCD), and in this case, the display unit 160 includes an LCD controller, a memory for storing image data, and an LCD panel. The LCD may serve as an input unit with a touch screen, and in this case, the display unit 160 may display the alphanumeric keys of the key input unit 127.

The face recognition unit 170 recognizes a facial image from a captured image and transmits coordinates of the recognized facial image to the controller 110, according to an embodiment of the present invention.

An operation of controlling adjustment of a white balance in such a wireless terminal described above is described with reference to FIGS. 2 to 6.

Figure 2:
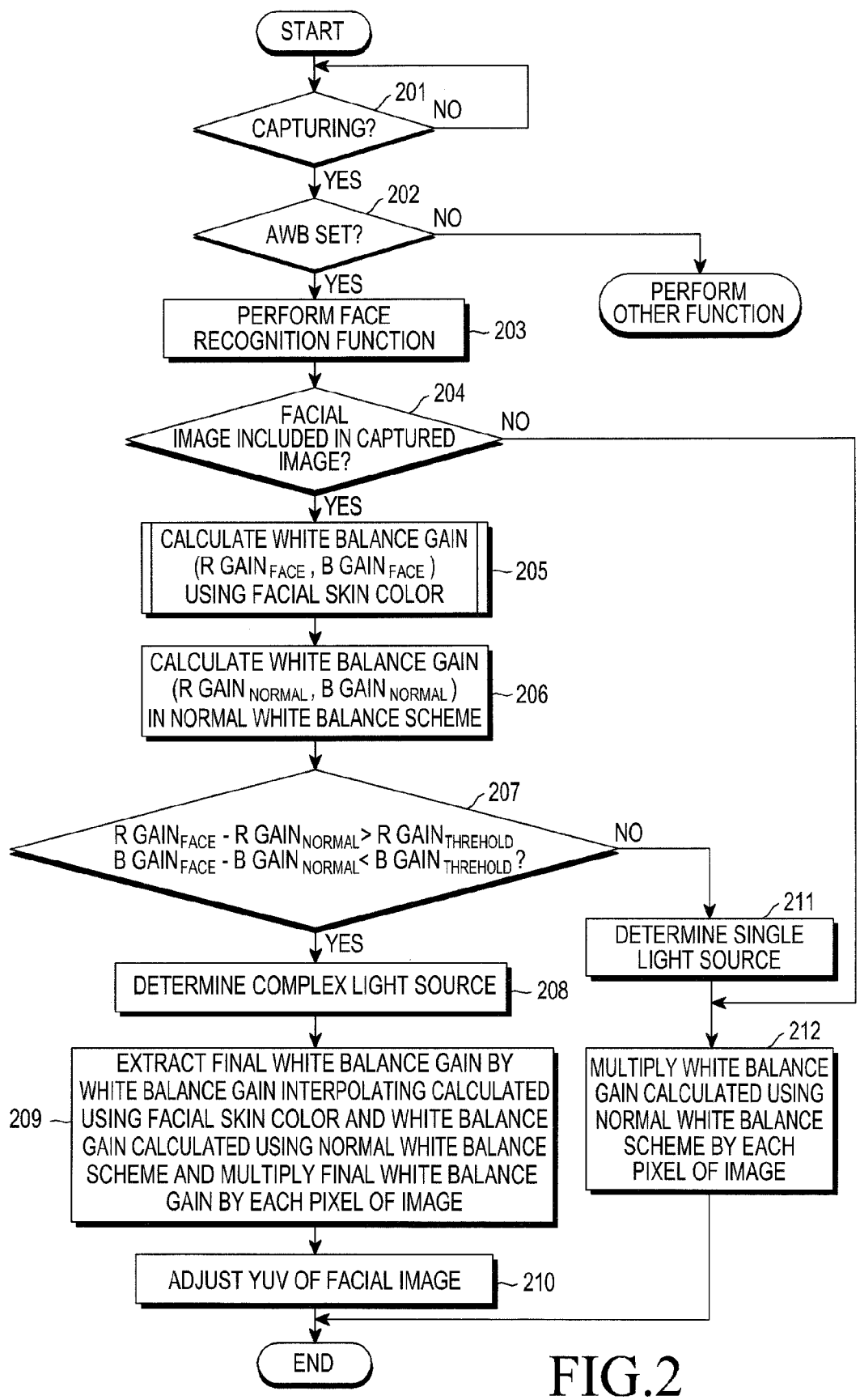
FIG. 2 is a flowchart illustrating a process of adjusting a white balance of an image captured with a complex light source in the wireless terminal, according to an exemplary embodiment of the present invention.
Figure 3:
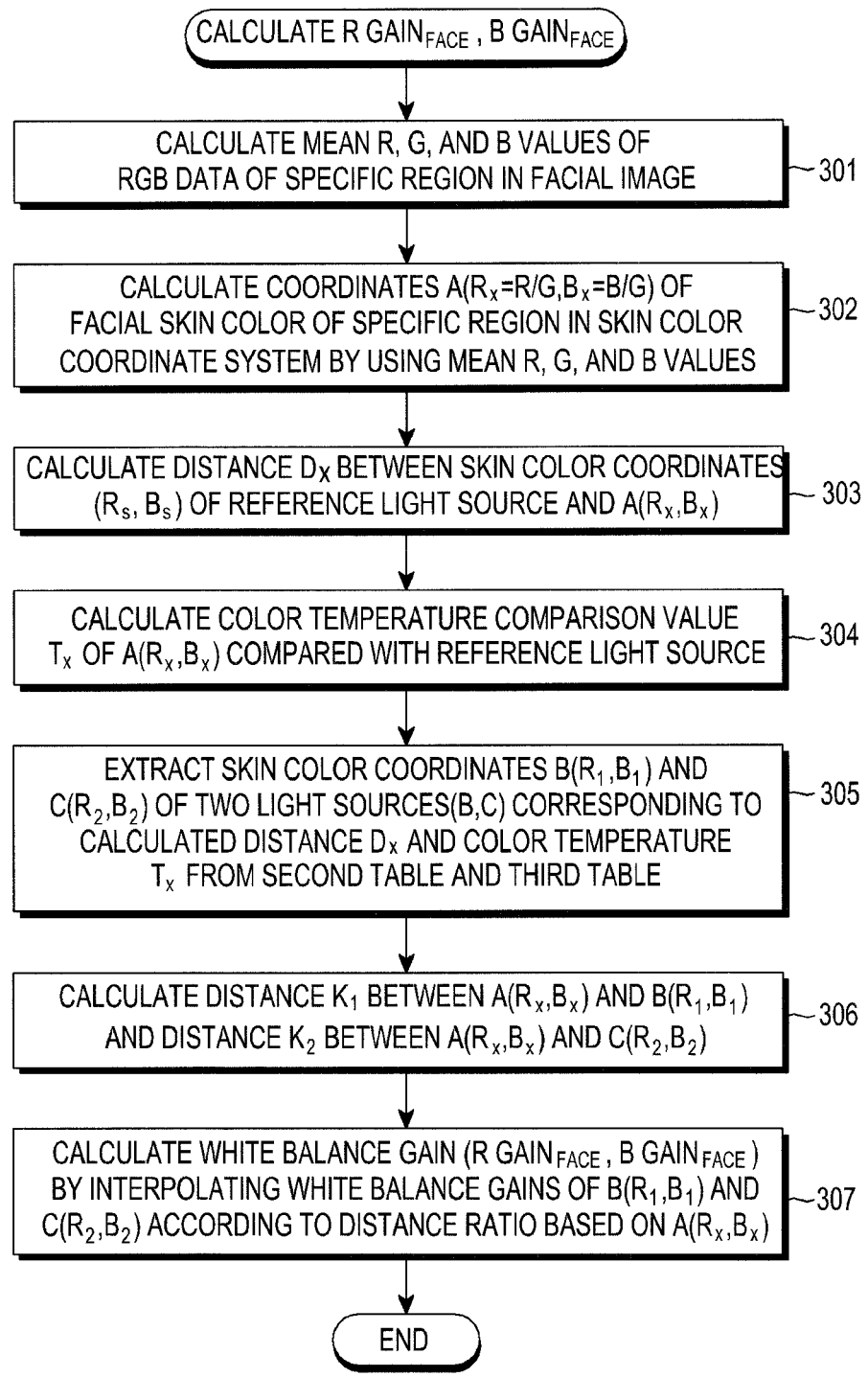
FIG. 3 is a flowchart illustrating a process of calculating a white balance gain by using a facial skin color according to an exemplary embodiment of the present invention.
Figure 4:
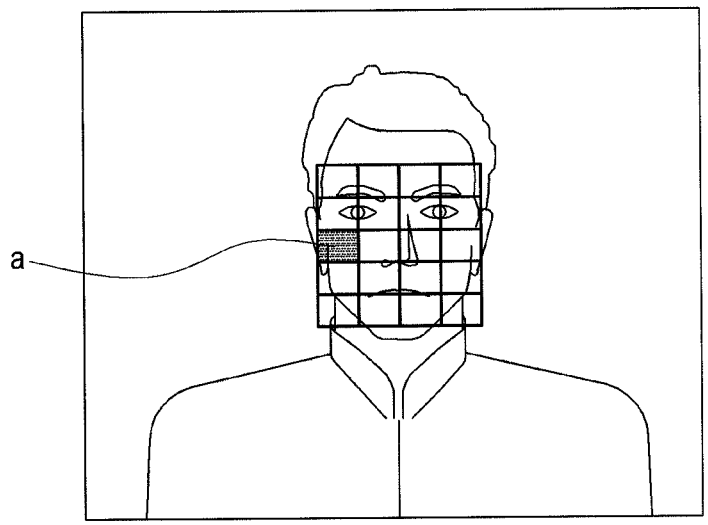
FIG. 4 is an illustrative diagram for describing a function of recognizing a face from a captured image according to an exemplary embodiment of the present invention.
Figure 5:
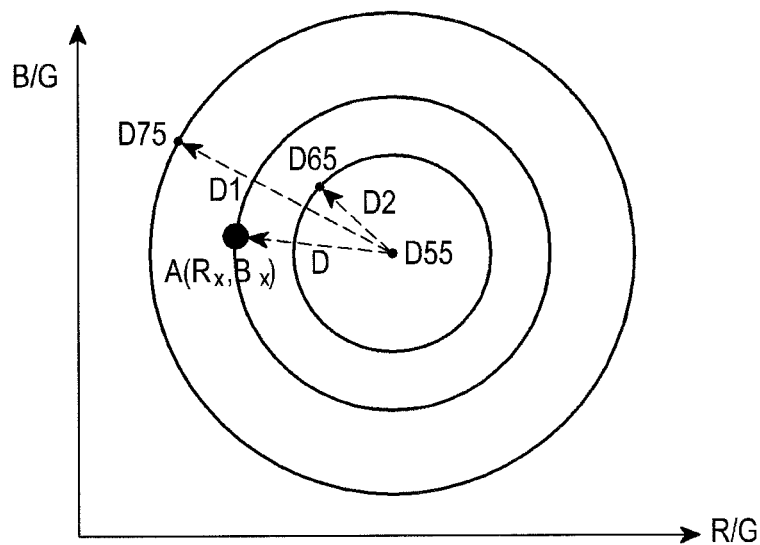
FIG. 5 is an illustrative diagram for describing a distance Dx between coordinates of a reference light source and coordinates of a facial skin color of a captured image in a skin color coordinate system according to an exemplary embodiment of the present invention.
Figure 6:
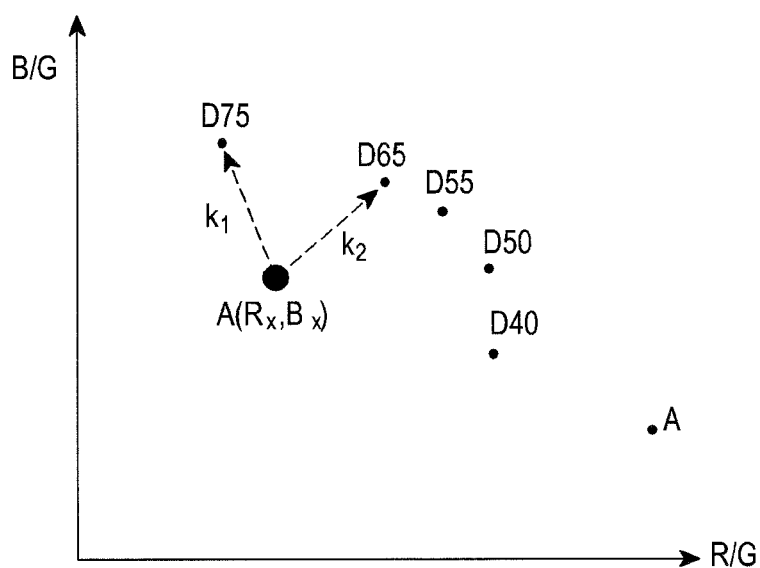
FIG. 6 is an illustrative diagram for describing distances K1 and K2 between the coordinates of a facial skin color of a captured image and coordinates of two selected light sources in a skin color coordinate system according to an exemplary embodiment of the present invention.

FIG. 2 is a flowchart illustrating a process of adjusting a white balance of an image captured with a complex light source in the wireless terminal, according to an exemplary embodiment of the present invention, FIG. 3 is a flowchart illustrating a process of calculating a white balance gain by using a facial skin color according to an exemplary embodiment of the present invention, FIG. 4 is an illustrative diagram for describing a function of recognizing a face from the captured image according to an exemplary embodiment of the present invention, FIG. 5 is an illustrative diagram for describing a distance $D_x$ between coordinates of a reference light source and coordinates of the facial skin color of the captured image in a skin color coordinate system according to an exemplary embodiment of the present invention, and FIG. 6 is an illustrative diagram for describing distances $K_1$ and $K_2$ between the coordinates of the facial skin color of the captured image and coordinates of two selected light sources in a skin color coordinate system according to an exemplary embodiment of the present invention. This exemplary embodiment is described with reference to FIG. 1.

Referring to FIG. 2, if capturing is selected in step 201, the controller 110 determines whether an AWB function is set in step 202. If the AWB function is set, the controller 110 controls the face recognition unit 170 to perform a face recognition function in step 203. If facial image coordinates are received from the face recognition unit 170, the controller 110 determines in step 204 that a facial image is contained in a captured image. In step 205, the controller 110 calculates a white balance gain ($RGain_{Face}$, $BGain_{Face}$) by using a facial skin color. A process of calculating a white balance gain ($RGain_{Face}$, $BGain_{Face}$) by using the facial skin color in step 205 is described with reference to FIG. 3.

Referring to FIG. 3, the controller 110 divides a face area into four equal parts in a horizontal direction and five equal parts in a vertical direction as shown in FIG. 4 by using the facial image coordinates received from the face recognition unit 170 and calculates mean values of RGB data of a specific region in the face area, e.g., a first horizontal and third vertical region a, in step 301.

For ease of understanding, FIGS. 2-6 are described with reference to exemplary mean values of the RGB data of the specific region that are calculated in step 301 as 751.6, 962.9, and 519.9, respectively.

In step 302, the controller 110 calculates coordinates $A(R_x, B_x)$ of the specific region based on a facial skin color in the skin color coordinate system by using the mean R, G, and B values calculated in step 301.

Since the mean R, G, and B values calculated in step 301 are 751.6, 962.9, and 519.9, respectively, the coordinates $A(R_x=R/G, B_x=B/G)$ of the specific region based on a facial skin color is $A(0.781, 0.540)$.

In step 303, the controller 110 calculates a distance $D_x$ between the skin color coordinates $(R_s, B_s)$ of the reference light source D55 and $A(R_x, B_x)$ by using Equation 1.

In this example, the distance $D_x$ between the skin color coordinates (0.892, 0.544) of the reference light source D55 and A(0.781, 0.540) is 0.11109. This value is obtained by referring to the first table stored in the memory 130 by using Equation 1 above in step 303.

In step 304, the controller 110 calculates a color temperature comparison value $T_x$ of $A(R_x, B_x)$ compared with the reference light source D55 by using Equation 2.

In this example, the color temperature comparison value $T_x$ of $A(R_x, B_x)$ compared with the reference light source D55 is −0.1065. This value is calculated by using the skin color coordinates (0.892, 0.544) of the reference light source D55 by using Equation 2 above in step 304.

Upon calculating the distance $D_x$ and the color temperature comparison value $T_x$ in steps 303 and 304, the controller 110 extracts $B(R_1, B_1)$ and $C(R_2, B_2)$ from the second and third tables stored in the memory 130 in step 305.

When the calculated color temperature comparison value $T_x$ is −0.1065 and the calculated distance $D_x$ is 0.11109, a light source D75 having a larger distance than 0.11109 and a light source D65 having a smaller distance than 0.11109 while having the same sign, i.e., minus(−), corresponding to T<0, are extracted from the third table in step 305.

FIG. 5 is an illustrative diagram for describing the distance Dx between coordinates of the reference light source D55 and the coordinates A(0.781, 0.540) of the facial skin color in the specific region of the captured image, a distance $D_1$ between the reference light source D55 and skin color coordinates (0.739, 0.614) of the extracted light source D75, and a distance D2 between the reference light source D55 and skin color coordinates (0.837, 0.574) of the extracted light source D65 in the skin color coordinate system.

In step 306, the controller 110 calculates a distance $K_1$ between $A(R_x, B_x)$ and $B(R_1, B_1)$ and a distance $K_2$ between $A(R_x, B_x)$ and $C(R_2, B_2)$ by using Equation 3 shown above. In the example given herein, the distance $K_1$ between A(0.781, 0.540) and the skin color coordinates (0.739, 0.614) of the light source D75 is 0.08461, and the distance $K_2$ between A(0.781, 0.540) and the skin color coordinates (0.837, 0.574) of the light source D65 is 0.06595. These values are calculated by using Equation 3.

Referring to FIG. 6, the figure shows the distance $K_1$ between $A(R_x, B_x)$ and $B(R_1, B_1)$ and the distance $K_2$ between $A(R_x, B_x)$ and $C(R2, B2)$.

Upon calculating the distance $K_1$ and the distance $K_2$ in step 306, the controller 110 extracts white balance gains of $B(R_1, B_x)$ and $C(R_2, B_2)$ from the fourth table stored in the memory 130 and calculates a white balance gain ($RGain_{Face}$, $BGain_{Face}$) in step 307 by interpolating the extracted white balance gains of $B(R_1, B_1)$ and $C(R_2, B_2)$ according to a distance ratio based on $A(R_x, B_x)$ by using Equation 4 above.

When $K_1=0.08461$ and $K_2=0.06595$ are interpolated by using Equation 4 shown above in step 307, the following values are obtained.

$$WBgain_R = \frac{0.066}{0.0846 + 0.066} \times 1.966 + \frac{0.0846}{0.0846 + 0.066} \times 1.812 = 1.879$$

$$WBgain_B = \frac{0.066}{0.0846 + 0.066} \times 1.305 + \frac{0.0846}{0.0846 + 0.066} \times 1.381 = 1.348$$

Accordingly, the white balance gain ($RGain_{Face}$, $BGain_{Face}$) calculated by using the facial skin color is (1.879, 1.348).

Returning to FIG. 2, upon calculating the white balance gain ($RGain_{Face}$, $BGain_{Face}$) by using the facial skin color as shown in FIG. 3, the controller 110 calculates a white balance gain ($RGain_{Normal}$, $BGain_{Normal}$) in the normal white balance scheme in step 206. In the example given herein, the white balance gain ($RGain_{Normal}$, $BGain_{Normal}$) calculated according to a white balance scheme in step 206 may be (1.750, 1.480).

In step 207, the controller 110 compares the white balance gain ($RGain_{Face}$, $BGain_{Face}$) calculated by using the facial skin color and the white balance gain ($RGain_{Normal}$, $BGain_{Normal}$) calculated in the normal white balance scheme with a predetermined reference white balance gain ($RGain_{Threshold}$, $BGain_{Threshold}$). If $RGain_{Face}-RGain_{Normal}>RGain_{Threshold}$ and $BGain_{Face}-BGain_{Normal}<BGain_{Threshold}$, the controller 110 determines in step 208 that the image has been captured with a complex light source.

Upon determining by using the facial skin color that the captured image has been captured with a complex light source, the controller 110 extracts a final white balance gain by interpolating the white balance gain ($RGain_{Face}$, $BGain_{Face}$) calculated by using the facial skin color and the white balance gain ($RGain_{Normal}$, $BGain_{Normal}$) calculated in the normal white balance scheme and multiplies the extracted final white balance gain by each pixel in the whole area of the captured image in step 209.

The interpolation of the two white balance gains in step 209 may be performed by a ratio of 1:1 or 2:1. In the example given, the white balance gain (1.879, 1.348) calculated by using the facial skin color and the white balance gain (1.750, 1.480) calculated using the normal white balance scheme are interpolated by a ratio of 1:1, resulting in the following values.

$$R\ Gain=(1.879+1.750)/2=1.815$$

$$B\ Gain=(1.348+1.480)/2=1.414$$

Accordingly, the controller 110 multiplies the final white balance gain (1.815, 1.414) by each pixel in the whole area of the captured image.

An image obtained by multiplying the final white balance gain by each pixel in the whole area of the captured image as described above may express the facial skin color most lively and even a background naturally. However, since the facial skin color may be bluish to a certain extent to prevent a background color from being unnatural, an optimum result may only be obtained if only the face area is compensated. In this case, because the color tone of the face area should be changed without changing brightness of the face area, the controller 110 transforms RGB data of the facial image in the image obtained by multiplying the final white balance gain by each pixel in the whole area of the captured image to YUV data, adjusts the YUV data by multiplying the YUV data by a predetermined constant to decrease a U value and increase a V value, and transforms the adjusted YUV data to RGB data in step 210.

If the conditions $RGain_{Face}-RGain_{Normal}>RGain_{Threshold}$ and $BGain_{Face}-BGain_{Normal}<BGain_{Threshold}$ are not satisfied in step 207, the controller 110 determines in step 211 that the image has been captured with a single light source. Upon determining that the image has been captured with a single light source, the controller 110 extracts a white balance gain in the normal white balance scheme and multiplies the extracted white balance gain by each pixel in the whole area of the captured image in step 212.

FIGS. 7A to 9B illustrate images captured before and after white balance adjustment is applied according to an exemplary embodiment of the present invention. Generally, a complex light source is applied in a case where a face is under a shade while a background is under the sun light or a case where a surrounding light source is a low color temperature light source such as an incandescent electric lamp or a halogen lamp while a relatively higher color temperature light source is shone on a face, e.g., a case where a flashlight is lit.

Figure 7A:
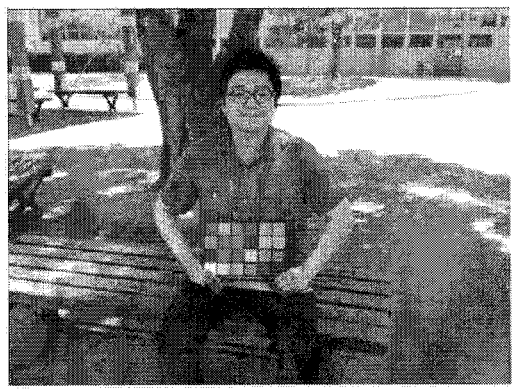
FIGS. 7A to 9B illustrate images captured before and after white balance adjustment is applied according to an exemplary embodiment of the present invention.
Figure 7B:
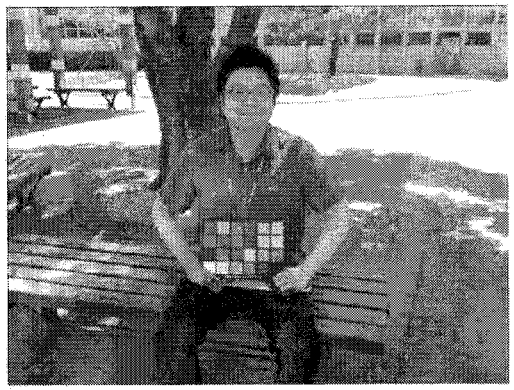

Referring to FIGS. 7A and 7B, FIG. 7A illustrates an image captured without applying the white balance function according to an exemplary embodiment of the present invention under a complex light source in a state where a face is under a shade while a background is under the sun light. FIG. 7B illustrates an image captured by applying the white balance function according to an exemplary embodiment of the present invention under the complex light source in the state where the face is under a shade while the background is under the sun light.

Figure 8A:
Figure 8B:

Referring to FIGS. 8A and 8B, FIG. 8A illustrates an image captured without applying the white balance function according to an exemplary embodiment of the present invention under a complex light source in a state where a face is under a shade while a background is under the sun light. FIG. 8B illustrates an image captured by applying the white balance function according to an exemplary embodiment of the present invention under the complex light source in the state where the face is under a shade while the background is under the sun light.

Figure 9A:
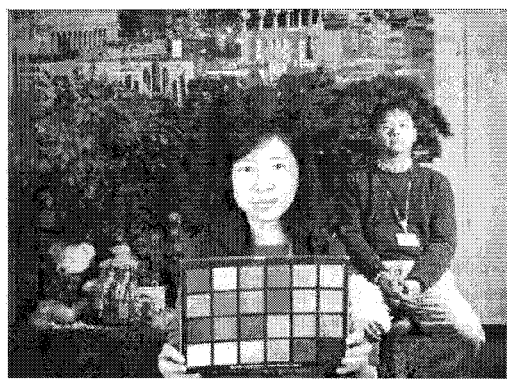
Figure 9B:
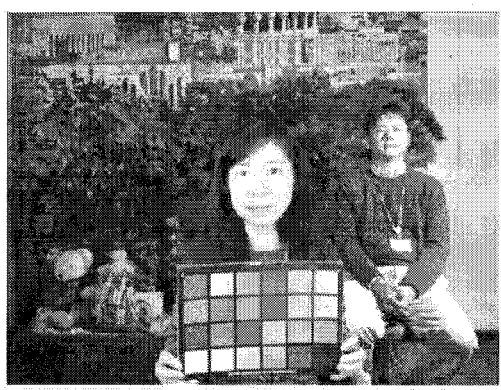

Referring to FIGS. 9A and 9B, FIG. 9A illustrates an image captured without applying the white balance function according to an exemplary embodiment of the present invention under a complex light source in a state where a low color temperature light source is shone on a background while a high color temperature light source is shone on a face, i.e., a case where a flashlight is lit. FIG. 9B illustrates an image captured by applying the white balance function according to an exemplary embodiment of the present invention under the complex light source in the state where a low color temperature light source is shone on the background while a high color temperature light source is shone on the face, i.e., the case where a flashlight is lit.

As is apparent from the foregoing description, the proposed apparatus and method for adjusting a white balance allows power of expression in a facial skin color to increase when a facial image is included in an image captured with a complex light source.

While the invention has been shown and described with reference to certain exemplary embodiments, such as a wireless terminal, thereof, it will be understood by those skilled in the art that various changes in form and details may be made therein without departing from the spirit and scope of the invention as defined by the appended claims and their equivalents.

What is claimed is:

1. An apparatus for adjusting a white balance, the apparatus comprising:
 a camera unit; and
 a controller for controlling recognition of a facial image from an image captured by the camera unit and, when it is determined that the image has been captured with a complex light source based on a comparison between a white balance gain calculated based on a facial skin color of the recognized facial image and a white balance gain calculated based on a white balance scheme, for adjusting a white balance of the captured image based on a final white balance gain extracted by interpolating the white balance gain calculated based on the facial skin color of the recognized facial image and the white balance gain calculated based on the white balance scheme, wherein the controller compares a white balance gain (RGain$_{Face}$, Bgain$_{Face}$) calculated based on the facial skin color and a white balance gain (RGain$_{Normal}$, Bgain$_{Normal}$) calculated in the white balance scheme with a predetermined reference white balance gain (RGain$_{Threshold}$, Bgain$_{Threshold}$) and determines that the image has been captured with a complex light source when RGain$_{Face}$−RGain$_{Normal}$>RGain$_{Threshold}$ and BGain$_{Face}$−Bgain$_{Normal}$<BGain$_{Threshold}$.

2. The apparatus of claim 1, further comprising:
a memory for storing a first table for storing mean R, G, and B values of an arbitrary facial skin color and coordinates (R/G, B/G) indicating a location of the mean R, G, and B values in a skin color coordinate system under each of a plurality of light sources, a second table for storing a distance D between a reference light source and each of the other light sources in the plurality of light sources, a third table for storing a color temperature T of the facial skin color under each of the plurality of light sources based on the reference light source, and a fourth table for storing a white balance gain of the facial skin color under each of the plurality of light sources in the white balance scheme.

3. The apparatus of claim 1, wherein the controller recognizes the facial image from the captured image based on a face recognition function, calculates mean R, G, and B values of RGB data of a facial skin color in a specific region of the recognized facial image, calculates A(R$_x$=R/G, B$_x$=B/G) indicating coordinates of the facial skin color in the specific region in the skin color coordinate system based on the calculated mean R, G, and B values, calculates a distance D$_x$ between coordinates (R$_s$, B$_s$) of a reference light source and A(R$_x$, B$_x$) in the skin color coordinate system, and calculates a color temperature comparison value T$_x$ of A(R$_x$, B$_x$) compared with the reference light source.

4. The apparatus of claim 3, wherein the controller calculates the distance D$_x$ between the coordinates (R$_s$, B$_s$) of the reference light source and A(R$_x$, B$_x$) based on $$D_x = \sqrt{(R_x - R_s)^2 + (B_x - B_s)^2}.$$

5. The apparatus of claim 3, wherein the controller calculates the color temperature comparison value T$_x$ of A(R$_x$, B$_x$) compared with the reference light source based on $$T_x = (R_x - B_x) - (R_z - B_z).$$

6. The apparatus of claim 3, wherein the controller extracts B(R$_1$, B$_1$) and C(R$_2$, B$_2$),
wherein B(R$_1$, B$_1$) are skin color coordinates for a light source having a larger distance than the calculated distance D$_x$ between the coordinates (R$_s$, B$_s$) of the reference light source and A(R$_x$, B$_x$) while having the same sign as that of the calculated color temperature comparison value T$_x$ of A(R$_x$, B$_x$) compared with the reference light source,
wherein C(R$_2$, B$_2$) are skin color coordinates for a light source having a smaller distance than the calculated distance D$_x$ between the coordinates (R$_s$, B$_s$) of the reference light source and A(R$_x$, B$_x$) while having the same sign as that of the calculated color temperature comparison value T$_x$ of A(R$_x$, B$_x$) compared with the reference light source, wherein the controller obtains the calculated distance D$_x$ between the coordinates (R$_s$, B$_s$) of the reference light source and A(R$_x$, B$_x$) from a second table for storing distances between the reference light source and a plurality of light sources, and
wherein the controller obtains the calculated color temperature comparison value T$_x$ of A(R$_x$, B$_x$) compared with the reference light source from a third table for storing color temperatures for the plurality of light sources that are stored in a memory.

7. The apparatus of claim 6, wherein the controller calculates a distance K$_1$ between A(R$_x$, B$_x$) and B(R$_1$, B$_1$) and a distance K$_2$ between A(R$_x$, B$_x$) and C(R$_2$, B$_2$) according to $$k_1 = \sqrt{(R_x - R_1)^2 + (B_x - B_1)^2}, k_2 = \sqrt{(R_x - R_2)^2 + (B_x - B_2)^2}.$$

8. The apparatus of claim 7, wherein the controller extracts white balance gains of B(R$_1$, B$_1$) and C(R$_2$, B$_2$) from a fourth table for storing a white balance gain of the facial skin color under each of the plurality of light sources that is stored in the memory, and calculates a white balance gain (RGain$_{Face}$, BGain$_{Face}$) by interpolating the extracted white balance gains of B(R$_1$, B$_1$) and C(R$_2$, B$_2$) according to a distance ratio based on A(R$_x$, B$_x$) based on $$WBgain_R = \frac{K_2}{K_1 + K_2} + WBgain_1 + \frac{K_1}{K_1 + K_2} WBgain_2$$

where WBgain$_1$ denotes an R gain of the white balance gain of B(R$_1$, B$_1$), WBgain$_2$ denotes an R gain of the white balance gain of C(R$_2$, B$_2$), and $$WBgain_B = \frac{K_2}{K_1 + K_2} + WBgain_1 + \frac{K_1}{K_1 + K_2} WBgain_2$$

where WBgain$_1$ denotes a B gain of the white balance gain of B(R$_1$, B$_1$), WBgain$_2$ denotes a B gain of the white balance gain of C(R$_2$, B$_2$).

9. The apparatus of claim 1, wherein the controller multiplies the final white balance gain by each pixel of the captured image and adjusts YUV of the facial image in the image.

10. The apparatus of claim 9, wherein the controller transforms RGB data of the facial image to YUV data, multiplies the YUV data by a predetermined constant to decrease a U value and increase a V value, and transforms the adjusted YUV data to RGB data.

11. A method of adjusting a white balance, the method comprising:
recognizing a facial image from a captured image;
calculating a white balance gain based on a facial skin color of the recognized facial image and calculating a white balance gain based on a white balance scheme; and
when it is determined based on a comparison between the two calculated white balance gains that the image has been captured with a complex light source, adjusting a white balance of the captured image based on a final white balance gain extracted by interpolating the white balance gain calculated based on the facial skin color of the recognized facial image and the white balance gain calculated based on the white balance scheme, wherein the determining that the image has been captured with a complex light source comprises: comparing a white balance gain (RGain$_{Face}$, Bgain$_{Face}$) calculated based on the facial skin color and a white balance gain (RGain$_{Normal}$, Bgain$_{Normal}$) calculated in the white balance scheme with a predetermined reference white balance gain (RGain$_{Threshold}$, BGain$_{Threshold}$); and determining that the image has been captured with a complex light source when RGain$_{Face}$−RGain$_{Normal}$>RGain$_{Threshold}$ and BGain$_{Face}$−Bgain$_{Normal}$<BGain$_{Threshold}$.

12. The method of claim 11, further comprising:
previously storing, in a memory, a first table for storing mean R, G, and B values of an arbitrary facial skin color and coordinates (R/G, B/G) indicating a location of the mean R, G, and B values in a skin color coordinate system under each of a plurality of light sources,
previously storing, in the memory, a second table for storing a distance D between a reference light source and each of the other light sources in the plurality of light sources,
previously storing, in the memory, a third table for storing a color temperature T of the facial skin color under each of the plurality of light sources based on the reference light source, and
previously storing, in the memory a fourth table for storing a white balance gain of the facial skin color under each of the plurality of light sources in the white balance scheme.

13. The method of claim 11, wherein the calculating of the white balance gain (RGain$_{Face}$, BGain$_{Face}$) based on the facial skin color comprises:
calculating mean R, G, and B values of RGB data of a facial skin color in a specific region of the recognized facial image;
calculating A(R$_x$=R/G, B$_x$=B/G) indicating coordinates of the facial skin color in the specific region in a skin color coordinate system based on the calculated mean R, G, and B values;
calculating a distance D$_x$ between coordinates (R$_s$, B$_s$) of a reference light source and A(R$_x$, B$_x$) in the skin color coordinate system and calculating a color temperature comparison value T$_x$ of A(R$_x$, B$_x$) compared with the reference light source;
extracting B(R$_1$, B$_1$) and C(R$_2$, B$_2$), where B(R$_1$, B$_1$) are skin color coordinates for a light source having a larger distance than the calculated distance D$_x$ between the coordinates (R$_x$, B$_x$) of the reference light source and A(R$_x$, B$_x$) while having the same sign as that of the calculated color temperature comparison value T$_x$ of A(R$_x$, B$_x$) compared with the reference light source, where C(R$_2$, B$_2$) are skin color coordinates for a light source having a smaller distance than the calculated distance D$_x$ between the coordinates (R$_s$, B$_s$) of the reference light source and A(R$_x$, B$_x$) while having the same sign as that of the calculated color temperature comparison value T$_x$ of A(R$_x$, B$_x$) compared with the reference light source, where the calculated distance D$_x$ between the coordinates (R$_s$, B$_s$) of the reference light source and A(R$_x$, B$_x$) is obtained from a second table for storing distances between the reference light source and a plurality of light sources, and where the calculated color temperature comparison value T$_x$ of A(R$_x$, B$_x$) compared with the reference light source is obtained from a third table for storing color temperatures for the plurality of light sources that are stored in a memory;
calculating a distance K$_1$ between A(R$_x$, B$_x$) and B(R$_1$, B$_1$) and a distance K$_2$ between A(R$_x$, B$_x$) and C(R$_2$, B$_2$); and
calculating the white balance gain (RGain$_{Face}$, BGain$_{Face}$) by interpolating white balance gains of B(R$_1$, B$_1$) and C(R$_2$, B$_2$) according to a distance ratio based on A(R$_x$, B$_x$).

14. The method of claim 13, wherein the distance D$_x$ between the coordinates (R$_s$, B$_s$) of the reference light source and A(R$_x$, B$_x$) is calculated based on $$D_x = \sqrt{(R_x - R_s)^2 + (B_x - B_s)^2}$$

15. The method of claim 13, wherein the color temperature comparison value T$_x$ of A(R$_x$, B$_x$) compared with the reference light source is calculated based on $$T_x = (R_x - B_x) - (R_s - B_s).$$

16. The method of claim 13, wherein the distance K$_1$ between A(R$_x$, B$_x$) and B(R$_1$, B$_1$) and the distance K$_2$ between A(R$_x$, B$_x$) and C(R$_2$, B$_2$) are calculated based on $$k_1 = \sqrt{(R_x - R_1)^2 + (B_x - B_1)^2}, k_2 = \sqrt{(R_x - R_2) + (B_x - B_2)^2}.$$

17. The method of claim 13, wherein the white balance gains of B(R$_1$, B$_1$) and C(R$_2$, B$_2$) are extracted from a fourth table for storing a white balance gain of the facial skin color under each of the plurality of light sources that is stored in the memory, and
wherein the white balance gain (RGain$_{Face}$, BGain$_{Face}$) is calculated by interpolating the extracted white balance gains of B(R$_1$, B$_1$) and C(R$_2$, B$_2$) according to a distance ratio based on A(R$_x$, B$_x$) based on $$WBgain_R = \frac{K_2}{K_1 + K_2} + WBgain_1 + \frac{K_1}{K_1 + K_2} WBgain_2$$

where WBgain$_1$ denotes an R gain of the white balance gain of B(R$_1$, B$_1$), WBgain$_2$ denotes an R gain of the white balance gain of C(R$_2$, B$_2$), and $$WBgain_B = \frac{K_2}{K_1 + K_2} + WBgain_1 + \frac{K_1}{K_1 + K_2} WBgain_2$$

where WBgain$_1$ denotes a B gain of the white balance gain of B(R$_1$, B$_1$), WBgain$_2$ denotes a B gain of the white balance gain of C(R$_2$, B$_2$).

18. The method of claim 11, further comprising multiplying the final white balance gain by each pixel of the captured image and adjusting YUV of the facial image in the image.

19. The method of claim 18, wherein the adjusting of the YUV comprises:
transforming RGB data of the facial image to YUV data; and
multiplying the YUV data by a predetermined constant to decrease a U value and increase a V value and transforming the adjusted YUV data to RGB data.

* * * * *